United States Patent [19]
Bragaw, Jr. et al.

[11] Patent Number: 4,877,683
[45] Date of Patent: Oct. 31, 1989

[54] FLUOROPOLYMER LAMINATES

[75] Inventors: Chester G. Bragaw, Jr., Kennett Square; Thomas P. Concannon, Newtown Square, both of Pa.; Robert F. Davis, Wilmington, Del.

[73] Assignee: E. I. Du Pont De Nemours and Company, Wilmington, Del.

[21] Appl. No.: 198,521

[22] Filed: May 25, 1988

[51] Int. Cl.$^4$ .................. B32B 27/08; B32B 27/32
[52] U.S. Cl. ............................... 428/421; 428/422
[58] Field of Search ............... 428/422, 421, 451, 412; 156/209; 264/171

[56] References Cited

U.S. PATENT DOCUMENTS

| 3,986,997 | 10/1976 | Clark | 428/412 X |
| 4,177,315 | 12/1979 | Ubersax | 428/451 X |
| 4,252,859 | 2/1981 | Concannon et al. | 428/422 |
| 4,693,926 | 9/1987 | Kowalski et al. | 428/421 X |
| 4,721,592 | 1/1988 | Fruehauf et al. | 264/171 |

Primary Examiner—Thomas J. Herbert
Attorney, Agent, or Firm—Donald W. Huntley

[57] ABSTRACT

Laminates of polyvinyl fluoride and at least one other fluoropolymer that are free from adhesive at the interface and a process for preparing the laminates by dispersion coating a first film to form a second film and curing the second film at a temperature below the melting point of the first film.

8 Claims, No Drawings

FLUOROPOLYMER LAMINATES

BACKGROUND OF THE INVENTION

Decorative surfaces have typically been applied to a finished surface as a coating. For example, automobile parts have traditionally been prepared by first forming the part, and then coating the part with one or more finishing layers. Recently, dual coatings have been developed in which one coat contains pigment or other colorant and another coat provides a clear, gloss finish.

It has now been proposed to prepare decorated articles, in essence, by first preparing the decorative surface and then applying the substrate to the decorative surface. Often, the decorative surface alone or the entire structure would be shaped, as by thermoforming, to the desired final configuration.

With the use of dual coatings for decorative finishes, laminates have been sought which provide colorant in one layer and a clear, gloss finish in the other, and which can be effectively thermoformed. It has also been desired to prepare such a laminate without the use of adhesives between layers of fluoropolymer.

Fluoropolymers such as polyvinylfluoride are known to exhibit exceptional resistance to weathering and solvents, and accordingly could provide an excellent finish surface, for example, for exterior automobile parts. However, it has previously been necessary to use adhesive bonding techniques to prepare laminates of two or more layers of such materials, which would be necessary for a multiple decorative layer. Such adhesive bonding, in addition to requiring an additional manufacturing step, could change the visual effect of a decorative surface.

SUMMARY OF THE INVENTION

The present invention provides a laminate of polyvinyl fluoride and at least one other layer that is free from adhesive at the interface, and which can be effectively thermoformed.

Specifically, the instant invention provides a laminate comprising at least two adjacent layers of fluoropolymer, at least one of which is polyvinyl fluoride, the laminate being free from adhesive between the adjacent fluoropolymer layers, having a film-tearing interfacial bond and substantially no interfacial comingling of the adjacent fluoropolymer layers beyond the molecular level.

The present invention further provides a process for the preparation of a fluropolymer laminate having at least one layer of polyvinyl fluoride which comprises forming a first fluoropolymer layer, applying a second fluoropolymer layer as a dispersion, and coalescing the second fluoropolymer layer at a temperature below the melting point of the first fluoropolymer layer.

DETAILED DESCRIPTION OF THE INVENTION

The laminates of the present invention comprise at least one layer of polyvinylfluoride. The present laminates can also effectively use polyvinylfluoride in two or more layers.

Other fluoropolymers which can be used in the present laminates include homopolymers and copolymers of monoethylenically unsaturated hydrocarbon monomers completely substituted with fluorine atoms or completely substituted with a combination of fluorine atoms and chlorine atoms. In this context, the term copolymer is used in its usual sense to mean that the polymer contains two or more different monomer units. Included are perfluoroelefin polymers such as polyteterafluoroethylene (PTFE) and copolymers of tetrafluoroethylene with one or more of hexafluoropropylene, perfluoro(alkyl vinyl ether) or vinylidene fluoride. Copolymers of tetrafluoroethylene and perfluoro(alkyl vinyl ether) are designated PFA. Such polymers and copolymers are described, for example, in Concannon et al., U.S. Pat. No. 4,252,859, hereby incorporated by reference. Other fluoropolymers which can be used effectively in the present invention in combination with the required polyvinylfluoride layer are copolymers of tetrafluoroethylene and fluorochlorocarbons such as chlorotrifluoroethylene. Still other fluoropolymers which can be used in the present laminates include copolymers of tetraflouroethylene and ethylene.

The first layer of the present laminates, which is the outer layer of a finished article, can be either a preformed film or prepared from a dispersion which is cast onto a support surface. In the event that preformed films are used, the films can be oriented to provide greater toughness and film strength.

In general, the first layer is prepared by forming a polymeric film on a supporting surface, either as molten polymer or from a dispersion which is subsequently coalesced into a film. The supporting surface is not critical, and can be any surface from which the formed film can be readily removed, such as another polymeric film or a steel belt. Oriented films of polyethylene terephthalate have been found to be particualrly satisfactory as support surfaces for the fluoropolymers from which the present laminates are prepared.

The first fluoropolymer layer can be preformed or preferably is prepared in situ from a dispersion of the polymer in solvent and subsequently coalesced into a film. In the preparation of such disperions, particulate polymer is typically added to solvent and dispersed with the aid of a sand mill. Polyvinyl fluoride dispersions which can be used include those described in detail in U.S. Pat. Nos. 2,953,818 to Bartron et al. and 3,139,470, to Prengle et al. both of which are hereby incorporated by reference.

The dispersion can then be applied to the support surface by any conventional means, such as spray, roll, knife, curtain, gravure coaters, or any method that permits the application of a uniform film without streaks or other defects.

The thickness of the first layer is not critical, so long as the layer has a sufficient thickness to be satisfactorily removed from the substrate. In general, a thickness of at least about 0.05 mil is satisfactory, and thicknesses of up to about 15 mils can be used effectively in the context of the present invention.

The first layer, if formed from a dispersion, can be coalesced by removing the solvent with heat, but at a temperature below the melting point of the coalesced polymer. Typically, oven temperatures of about from 340° to 480° F. can be used for most polyvinyl fluorides to coalesce the film, and temperatures of about from 380° to 420° F. have been found particularly satisfactory. The oven temperatures, of course, are not representative of the temperatures of the polymer being treated, which will be lower.

The layers of the present laminates other than the first layer formed can be the same or different, as long as the second layer can be formed and coalesced at temperature lower than the melting temperature of the first layer. If polyvinylfluoride is used as the first layer, this polymer degrades at its melt temperature, which is typically 192° C. or 392° F. In addition, any orientation of films will be lost as the temperature approaches the melting point of the polymer.

In still another embodiment of the present invention, a reinforcing net or scrim can be interposed between the two layers of the laminate. The nature of the net or scrim is not critical, so long as the two layers of fluoropolymer are able to come into contact to form the required interface, in which the adjacent fluoropolymer layers have a film-tearing interfacial bond and substantially no interfacial comingling of the adjacent fluoropolymer layers beyond the molecular level.

The coalesced film should contain less than about 10% solvent and preferably less than about 2% solvent. Solvent contents higher than about 10% may result in attack or solvation of the adjacent layers and depreciate the appearance of the laminate. The second layer formed is accordingly preferred to be polyvinyl fluoride, since this material has a low melting point, and can be conveniently formed from a dispersion. This low melt characteristic is important in achieving the required film-tearing bond of the present laminates.

For high quality automotive finishes, for example, it is preferred to use a polyvinyl fluoride for the layer in which the colored pigment is dispersed.

Pigments of the type conventionally used in coating compositions can be incorporated into one or more of the layers of the present laminates. Representative pigments which can be used, for example, include metallic oxides such as titanium dioxide, zinc oxide, and iron oxide, metal hydroxides, metal flakes such as aluminum flake, chromates such as lead chromate, sulfides, sulfates, carbonates, carbon black, silica, talc, china clay, phthalocyanine blues and greens, organo reds, organo maroons and other organic pigments and dyes.

The pigments are generally formulated into a mill base by mixing the pigments with a dispersing resin which can be the same as the binder of the layer or another compatible dispersing resin or agent. The pigment dispersion is formed by conventional means such as sand grinding, ball milling, attritor grinding, and two roll milling. The mill base is then blended with the polymer and the layer formed according to the technniques described.

To improve weatherability of a decorative finish, such as that used in automotive applications, about from 0.1 to 5% by weight of polymer, of one or more ultraviolet light stabilizers can be incorporated into the one or more layers of the laminate, generally the layer which will be the outer layer of the finished article.

Many fluoropolymers, including polyvinyl fluoride, can be readily scratched or marred. Accordingly, it is preferred to incorporate a scratch resistant coating on the surface of the present laminates that will represent the outer surface of the finished article onto which the laminate is incorporated. A wide variety of such coatings can be used, including, for example, those described in U.S. Pat. Nos. 4,177,315 to Ubersax and 3,986,997, to Clark both hereby incorporated by reference.

When used, the abrasion resistant coating can be applied before or after the laminate is formed. That is, the coating can be applied to the support film before the application of the fluoropolymer layers, or applied to the finished laminate. An abrasion resistant coating is preferably applied to the support film, so that the laminate, when stripped from the support film, already bears the protective layer.

The laminates of the present invention are useful for the preparation of decorated surfaces in which the laminates are the outer surface. For example, the laminates can be thermoformed, optionally with a backing or carrier sheet, to form a three-dimensionally shaped preformed laminate. This preformed laminate can then be placed in a mold and synthetic resinous substrate material molded to the preformed laminate to form the desired article.

Alternatively, the laminates of the present invention can be thermoformed onto a preformed substrate, to provide the finished furface for the preformed substrate.

As noted above, the separate layers of the present laminates can provide a combination of aesthetic effects, with differing coloration and pigmentation of the layers. In addition, the multi-layer construction of the laminates permits the preparation of higher quality films by the dispersion of potential film defects. For example, a composite polyvinyl fluoride film can be prepared according to the present invention in which any defects in one-half of the film are not present in the second half of the film by reason of the separate preparation of the two halves.

The invention is further illustrated by the following specific Examples.

EXAMPLE 1

A dispersion of 35% polyvinylfluoride (PVF) and 65% propylene carbonate was combined with N-methylpyrrolidone solvent. The ratio of the PVF in the dispersion to the solvent was 20 to 80. The PVF dispersion and the N-methylpyrrolidone solvent were combined in a resin kettle flask and heated to a temperature of 90 degrees C. with vigorous agitation. When the batch temperature reached 100 degrees C. the heating was discontinued and the resulting dispersion cooled to 40 degrees C. with agitation.

A substrate was prepared by wrapping panels with the polyethylene terephthalate film and baking them for a period of 4 minutes at a temperature of 380 degrees F. and then cooling. The heat tended to shrink the polyester substrate, providing a smooth wrinkle free surface on which to apply the polyvinylfluoride dispersion.

The dispersion was coated onto the polyester with a No. 70 wire rod drawdown blade to provide a one mil film thickness. The applied film was baked for a period of 4 minutes at 375 degrees F. and again cooled. The resulting cured PVF film was submerged in water to facilitate subsequent removal of the film from the substrate.

A pigmented dispersion was prepared using the same polyvinylfluoride dispersion as in the clear coat in combination with an acrylic resin dispersant, N-methylpyrrolidone and pigments in the ratio of 25 parts dispersant, 25 parts N-methylpyrrolidone solvent, 10 parts of pigment and 40 parts of the polyvinylfluoride dispersant. These components were ground in a sand mill to a 0.25 mil fineness using 2 passes on the sand mill. 400 parts of the pigment dispersion were combined with 800 additional parts of polyvinylfluoride dispersion. An additional 300 parts of the polyvinylfluoride dispersion and 120 parts acetone were added to provide the final dispersion formulation. This dispersion was applied to the surface of the earlier cured transparent polyvinylfluoride film using a No. 70 wire rod. After applying the dispersion, the panels were baked in an oven for a 2 minute period and then a 1.5 minute period at a temperature of 385 degrees F. The resulting laminates were stripped from the polyester substrate and found to have a good appearance.

The resulting laminate was tested for interfacial bond strength and found to exhibit a film tearing bond. Inspection of the interface gave no indication of interfacial co-mingling of the layers beyond the molecular level, as indicated by an absence of light scattering at the interface, which would create a milky appearance.

EXAMPLE 2

A clear fluorinated ethylene propylene (FEP) film having a thickness of 5 mils and supported on a metal substrate was coated with the pigmented PVF dispersion prepared in Example 1 above, using a drawdown blade to provide a thickness of the dispersion of 0.0024 inches on the substrate. The resulting dispersion coating was baked for four minutes at a temperature of 400 degrees F. The FEP had been surface treated to promote wetting by corona discharge.

The resulting laminate was evaluated and found to exhibit excellent adhesion and appearance.

EXAMPLES 3 and 4

In Examples 3 and 4, the general procedure of Example 2 was repeated, using base films of a copolymer of tetrafluoroethylene/ethylene and polytetrafluoroethylene in Examples 3 and 4, respectively. Both films had been surface treated to promote adhesion.

After curing the pigmented dispersion coating for four minutes at a temperature of 400 degrees F., the resulting laminates were evaluated and found to have excellent adhesion and appearance.

We claim:

1. A laminate comprising at least two abutting layers of fluoropolymer, at least one of which is polyvinyl fluoride, the laminate being free from adhesive between the adjacent fluoropolymer layers, having a film-tearing interfacial bond and substantially no interfacial comingling of the adjacent fluoropolymer layers beyond the molecular level.

2. A fluoropolymer laminate of claim 1 wherein the laminate comprises at least one layer of polytetrafluoroethylene.

3. A fluoropolymer laminate of claim 1 wherein the laminate comprises at least one layer of a copolymer of ethylene and tetrafluoroethylene.

4. A fluoropolymer laminate of claim 1 wherein the first film is treated to promote adhesion.

5. A fluoropolymer laminate of claim 1 wherein the laminate comprises two layers.

6. A fluoropolymer laminate of claim 5 wherein both layers consist essentially of polyvinyl fluoride.

7. A fluoropolymer laminate of claim 1 wherein the laminate comprises at least one layer of a copolymer of tetrafluoroethylene and perfluoro(alkyl vinyl ether).

8. A fluoropolymer laminate of claim 7 wherein the laminate comprises at least one layer of a copolymer of tetrafluoroethylene, hexafluoropropylene and perfluoro (alkyl vinyl ether).

* * * * *